(12) United States Patent
Shotwell

(10) Patent No.: US 10,947,786 B2
(45) Date of Patent: Mar. 16, 2021

(54) ROLLER REAMER WITH MECHANICAL FACE SEAL

(71) Applicant: CHENGDU BEST DIAMOND BIT CO., LTD., Sichuan (CN)

(72) Inventor: Duane Shotwell, Conroe, TX (US)

(*) Notice: Subject to any disclaimer, the term of this patent is extended or adjusted under 35 U.S.C. 154(b) by 263 days.

(21) Appl. No.: 15/828,246

(22) Filed: Nov. 30, 2017

(65) Prior Publication Data

US 2019/0162028 A1  May 30, 2019

(51) Int. Cl.
*E21B 10/25* (2006.01)
*E21B 10/30* (2006.01)
*F16J 15/34* (2006.01)

(52) U.S. Cl.
CPC .............. *E21B 10/25* (2013.01); *E21B 10/30* (2013.01); *F16J 15/344* (2013.01)

(58) Field of Classification Search
CPC .... E21B 10/25; E21B 10/30; E21B 2010/225; F16J 15/344
See application file for complete search history.

(56) References Cited

U.S. PATENT DOCUMENTS

| | | | |
|---|---|---|---|
| 1,139,529 A | 5/1915 | Hughes | |
| 1,474,633 A | 11/1923 | Hughes | |
| 1,487,319 A | 3/1924 | Oswald | |
| 3,977,481 A * | 8/1976 | Fisk | E21B 10/52 175/228 |
| 4,182,425 A * | 1/1980 | Garrett | E21B 10/24 175/228 |
| 4,189,012 A * | 2/1980 | Garrett | E21B 10/30 175/312 |
| 4,378,058 A * | 3/1983 | Allison | E21B 10/30 175/228 |
| 4,848,476 A | 7/1989 | Deane | |
| 4,919,220 A | 4/1990 | Fuller | |
| 5,033,558 A * | 7/1991 | Russo | E21B 7/068 175/325.3 |
| 6,386,299 B1 * | 5/2002 | Kato | E21B 7/28 175/385 |
| 7,997,659 B2 * | 8/2011 | Oertley | E21B 10/12 175/364 |
| 8,783,786 B2 * | 7/2014 | Shanahan | E21D 9/104 299/106 |

(Continued)

FOREIGN PATENT DOCUMENTS

AU 594885 C * 10/2004 ............. E21B 43/30

*Primary Examiner* — Daniel P Stephenson
(74) *Attorney, Agent, or Firm* — Patrick Reilly

(57) ABSTRACT

At least one mechanical face seal is disposed within a cutter cartridge of a roller reamer. The cutter cartridge includes a roller cutter and a retention assembly. A bearing shaft of the retention assembly extends through an inner channel of the roller cutter. A first mechanical face seal is disposed or shared between the roller cutter and a first pillow block of the retention assembly. An optional second mechanical face seal is disposed or shared between the roller cutter and a second pillow block of the retention assembly. Each pillow block is rotatably coupled at an opposing end of the bearing shaft. The retention assembly includes two separately matched sets of one pillow block and a wedge. The wedges in combination detachably secure the pillow blocks to a tool body of the roller reamer.

20 Claims, 11 Drawing Sheets

(56) References Cited

U.S. PATENT DOCUMENTS

| | | | |
|---|---|---|---|
| 2005/0252694 A1* | 11/2005 | Kennedy | E21B 10/24 175/406 |
| 2008/0202818 A1* | 8/2008 | McManus | E21B 10/24 175/393 |
| 2009/0194335 A1* | 8/2009 | Kennedy | E21B 10/24 175/228 |
| 2013/0133954 A1* | 5/2013 | Mohon | E21B 10/28 175/345 |
| 2019/0162026 A1* | 5/2019 | Shotwell | F16J 15/344 |
| 2019/0162027 A1* | 5/2019 | Shotwell | E21B 10/25 |
| 2019/0162028 A1* | 5/2019 | Shotwell | E21B 10/25 |

* cited by examiner

ROLLER REAMER WITH MECHANICAL FACE SEAL

FIELD OF THE INVENTION

The present invention relates generally to underground boring and, in particular, to a reamer assembly for enlarging or maintaining a clearance diameter of an existing borehole. More particularly, the present invention relates to roller reamers having roller cutter rotatably coupled with roller reamer tool bodies.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It is often necessary when drilling a borehole to maintain or enlarge the diameter of the borehole with second and subsequent passes of cutting components. This is necessary due to drill bit wear and gradual reduction in the gauge diameter of the hole. Also, certain materials being drilled can swell, which results in reduction of the borehole diameter after the drill bit has past.

The technique of reaming is a significant step in achieving the required diameter of the borehole. Accordingly, there is a long-felt need for reamers presenting improved reliability, construction and longevity and decreased maintenance requirements.

Reamers can be used in association with a drill bit to ensure that a borehole is drilled to a constant diameter. A roller-type reamer has cutting components rotatably mounted. The roller reamer is commonly used in the drilling industry, one purpose being to ream the hole just behind the drill bit to maintain hole size. A roller reamer can also act as a stabilizer above the drill bit to stabilize the drill bit and drill string against the deviating tendencies encountered during drilling.

Roller reamer roller assemblies that include roller cutters are generally intended to be coupled with a reamer body, or tool body, while allowing the roller cutters to freely rotate about an axis that is parallel with a central axis of the tool body. One problem with roller reamers is that under the conditions commonly encountered during drilling, rock chips and other debris can build up proximate to one or more roller assemblies, which may jam or slow rotation of the roller assemblies, thereby reducing their effectiveness. Also, even under normal operating conditions, rotation of the roller cutters can also cause a roller assembly to increase in temperature which further increases the stress on the rotating parts. Increased stress may cause those rotating parts to wear more quickly. This is a costly problem because the reamer will have to be brought to the surface, dismantled and reassembled.

It is an object of the present invention to provide a useful alternative means to seal a roller cutter from external debris of a borehole and thereby improve reliability and performance of the roller reamer.

SUMMARY AND OBJECTS OF THE INVENTION

Towards these and other objects of the present invention (hereinafter, "the invented roller reamer") that are made obvious to one of ordinary skill in the art in light of the present disclosure, an invented roller reamer is providing having at least one mechanical face seal disposed within a roller assembly that is coupled with a tool body. A retention assembly is detachably attached to a roller cutter of the roller assembly to form a cutter cartridge. Each of two sections of the retention assembly include a pillow block, wherein each pillow block is detachably positioned at opposing ends of the roller cutter. Each retention assembly section further includes a wedge that enables secure and detachable retention of the cutter cartridge into an axial recess of the tool body.

In one optional aspect of the invented roller reamer, a bearing shaft of the cutter cartridge extends wholly through a cavity of the roller assembly and is fixedly coupled at opposing ends to respective pillow blocks. The bearing shaft captures the roller assembly. An outer half of a first mechanical face seal is coupled with a first pillow block of a first section of the retention assembly and an inner half of the first mechanical face seal is coupled with at a first end of the roller assembly.

The first mechanical face seal includes an outer seal ring, an outer energizer, an inner seal ring and an inner energizer. The outer energizer is disposed under compression between the first pillow block and the outer seal ring. The outer energizer presses the outer seal ring against the inner seal ring. The inner energizer is disposed under compression between the roller cutter and the inner seal ring. The inner energizer presses the inner seal ring against the outer seal ring.

In another optional aspect of the invented roller reamer, another outer half of a second mechanical face seal is coupled with a second pillow block of a second section of the retention assembly and another inner half of the second mechanical face seal is coupled at a second end of the roller assembly.

The second mechanical face seal includes a second outer seal ring, a second outer energizer, a second inner seal ring and a second inner energizer. The second outer energizer is disposed under compression between the second pillow block and the second outer seal ring.

Certain alternate preferred embodiments of the invented roller reamer include two or more cutter cartridges coupled with a same tool body, wherein one or more mechanical face seals are separately disposed between pillow blocks and cutter assemblies.

More particularly, certain other alternate preferred embodiments of the invented reamer include three cutter cartridges coupled with an alternative tool body, wherein a separate mechanical face seal is disposed between each pillow block thereof and the attached roller cutter. Certain additional alternate preferred embodiments of the invented reamer include six cutter cartridges coupled with another alternative tool body, wherein a separate mechanical face seal is disposed between each pillow block thereof and the attached roller cutter.

Certain yet other alternate preferred embodiments of the invented reamer optionally include one or more of the features of: (a.) a plurality of ball bearings disposed within a race positioned about and circling the bearing shaft in a plane normal to the central tool axis; (b.) a plurality of cutting inserts positioned along an outer surface of the roller cutter; (c.) at least one cutting insert of the roller cutter having a central depression extending toward the central tool axis; (d.) at least one cutting insert of the roller cutter comprising tungsten carbide; and (e.) at least one cutting insert of the roller cutter comprising polycrystalline diamond.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

The present disclosure incorporates by reference the two previously filed US Nonprovisional patent applications, in their entirety and for all purposes, of U.S. Nonprovisional patent application Ser. No. 15/456,415, filed on Mar. 10, 2017, and titled REAMER FOR USE IN DRILLING OPERATIONS; and U.S. Nonprovisional patent application Ser. No. 15/387,875 filed on Dec. 22, 2016 and titled REAMER CUTTING INSERT FOR USE IN DRILLING OPERATIONS.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

It is understood that the word "exemplary" is used herein to mean "serving as an example, instance, or illustration." Any aspect described herein as "exemplary" is not necessarily to be construed as exclusive, preferred or advantageous over other aspects.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1A:
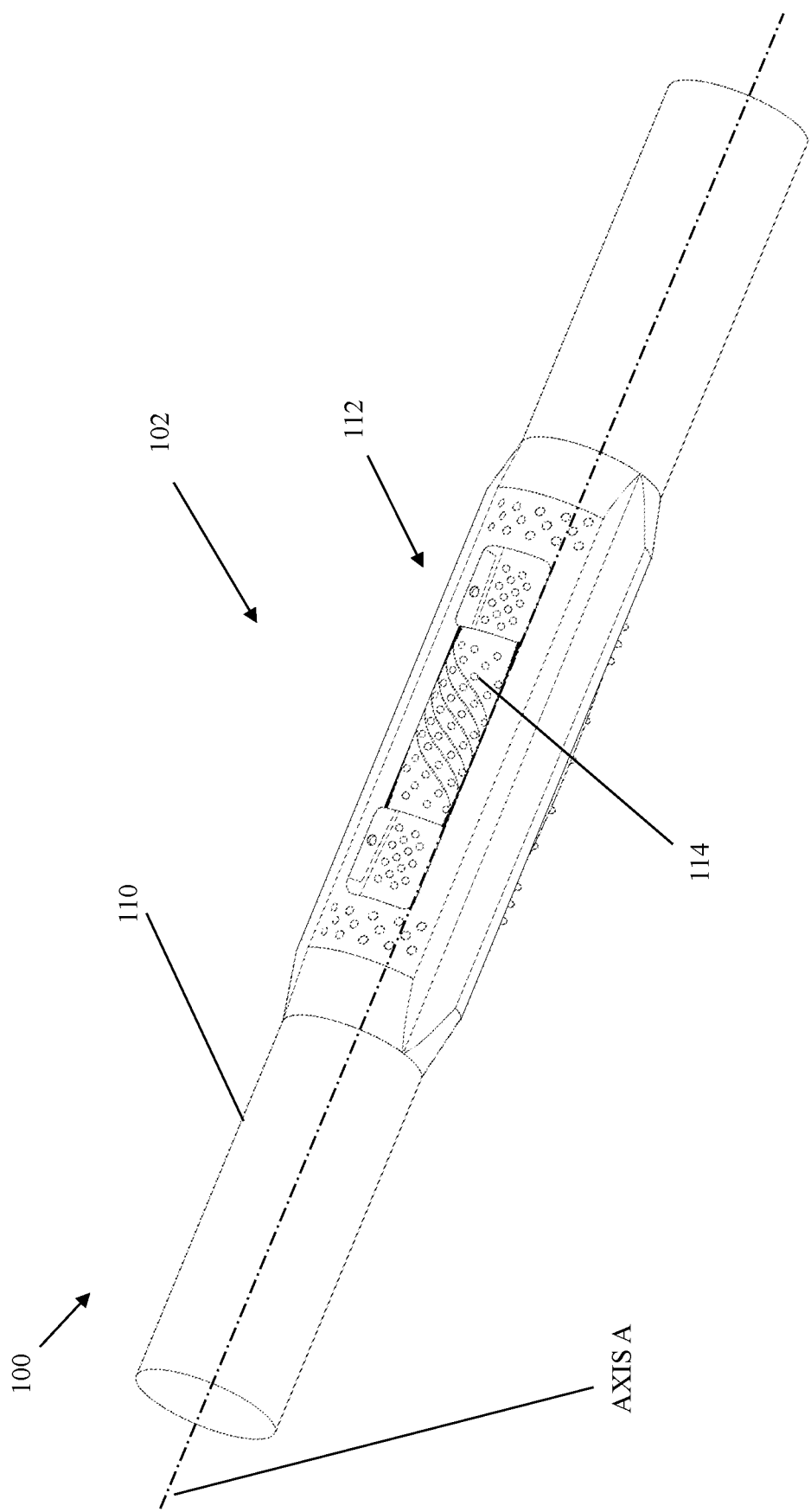
FIG. 1A is a side perspective view of a first preferred embodiment of the present invention (hereinafter, "first roller reamer") having three invented roller assemblies rotatably coupled within separate and individual axial recesses of a same tool body.
Figure 1B:
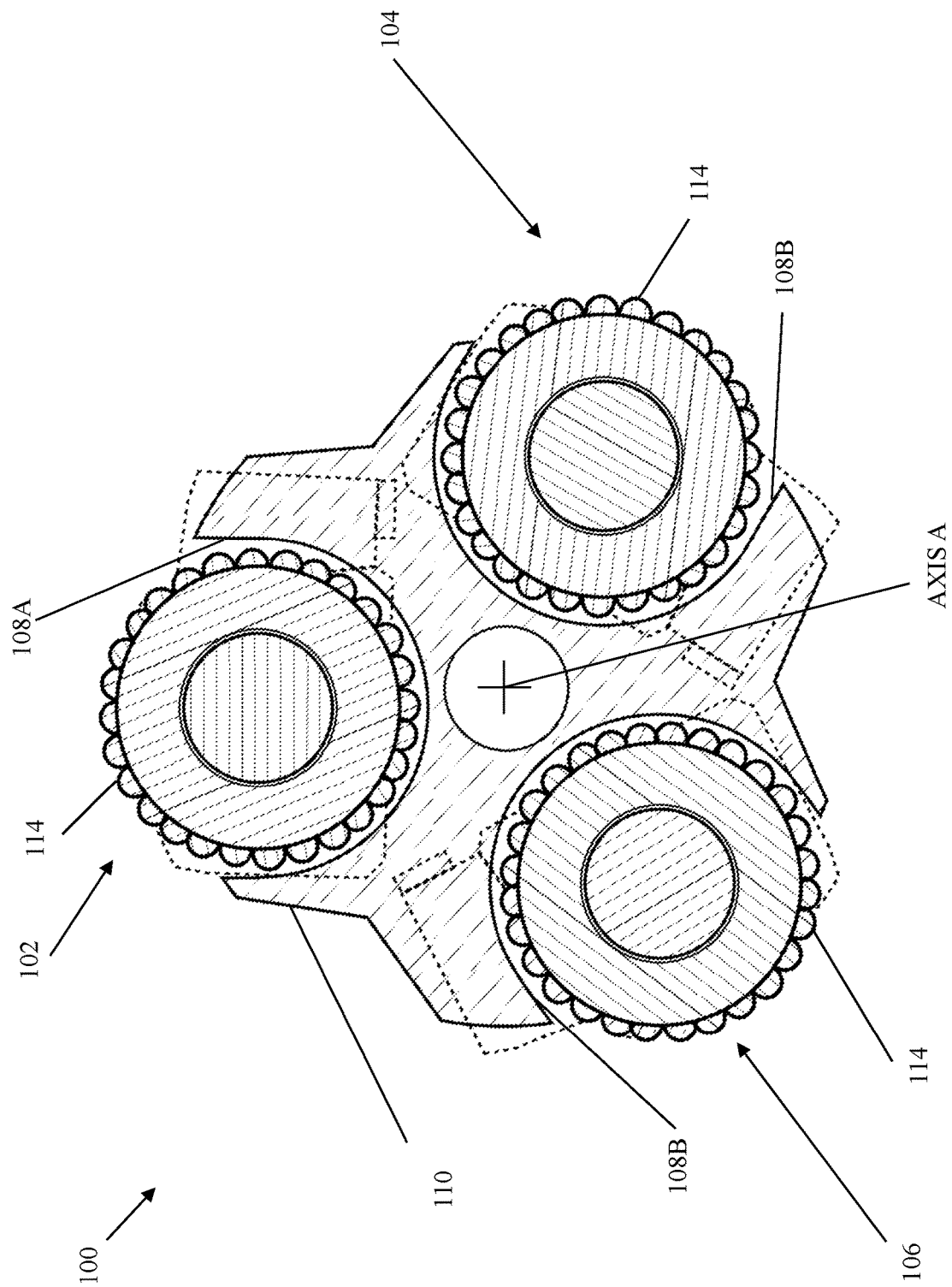
FIG. 1B is a top view cut-away view of the first roller reamer of FIG. 1A having three invented roller assemblies rotatably coupled within separate and individual axial recesses of the tool body of FIG. 1A.

Referring now generally to the Figures particularly to FIG. 1A and FIG. 1B, FIG. 1A is a top view of a first preferred embodiment of the invented roller reamer 100 (hereinafter, "the first reamer" 100) having three roller assemblies 102, 104 & 106 rotatably and removably coupled within separate and individual axial recesses 108A, 108B & 108C (as shown in FIG. 1B) of a tool body 110. A central tool axis A of the tool body 110 (hereinafter, "the tool axis A") extends centrally to the first invented roller assembly 102 along an elongate dimension of the tool body 110. For the sake of clarity of explanation the means of retaining of each individual cutter cartridge 112 of each of the three roller assemblies 102, 104 & 106 within the individual axial recesses of the tool body 110 are not presented fully in either FIG. 1A or FIG. 1B and are disclosed in detail at least in the text accompanying FIGS. 3, 4A and 4B. Each roller assembly 102, 104 & 106 includes a plurality of cutting inserts 114. One or more of the cutting inserts of the plurality of cutting inserts 114 may be or comprise tungsten carbide, polycrystalline diamond, or other suitable abrasive material known in the art.

Figure 2:
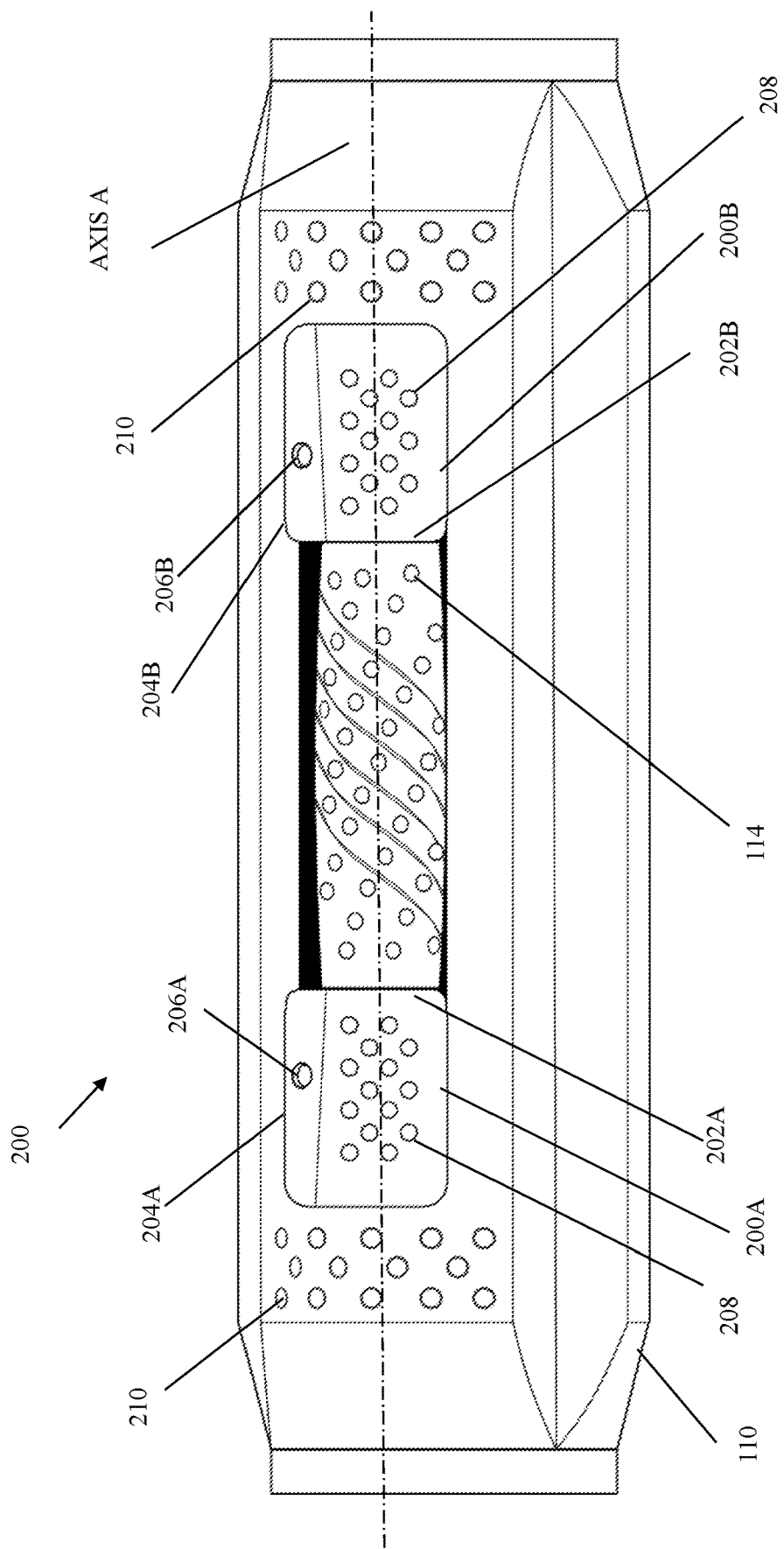
FIG. 2 is a side view of an exemplary roller assembly of FIG. 1A inserted into an exemplary axial recess of the tool body of FIG. 1A and rotatably coupled with a pair of pillow blocks of a first retention assembly.

Referring now generally to the Figures particularly to FIG. 2, FIG. 2 is a side view of the first exemplary invented roller assembly 102 of FIG. 1A (hereinafter, "the first roller assembly" 102) inserted into the first exemplary axial recess 108A of the tool body 110 of FIG. 1A. A pair of pillow blocks 200A & 200B are rotatably coupled with the first roller assembly 102. A first pillow block 200A is positioned at a first end 202A the first roller assembly 102. A first wedge 204A is removably coupled to the tool body 110 by a first bolt 206A.

A second pillow block 200B is positioned at a second end 202B of the first roller assembly 102. A second wedge 204B is removably coupled by a second bolt 206B to the tool body 110. The first wedge 204A and the second wedge 204B are sized and shaped to be respectively detachably attached by the bolts 206A & 206B to the tool body 110 to retain the pair of pillow blocks 200A & 200B and the first roller assembly 102 within the first axial recess 108A when the pair of pillow blocks 200A & 200B with the first roller assembly 102 are rotatably and detachably coupled. The pair of wedges 204A & 204B are sized and shaped to lock each respective pillow block pillow block 200A & 200B and coupled first roller assembly 102 in the axial and radial directions within the first axial recess 108A.

A second plurality of cutting inserts 208 are positioned on an external side the pillow blocks 200A & 200B, and a third plurality of cutting inserts 210 are positioned on an external side of the tool body 110. One or more of the cutting inserts of the second plurality of cutting inserts 208 or third plurality of cutting inserts 210 may be or comprise tungsten carbide, polycrystalline diamond, or other suitable abrasive material known in the art.

Figure 3:
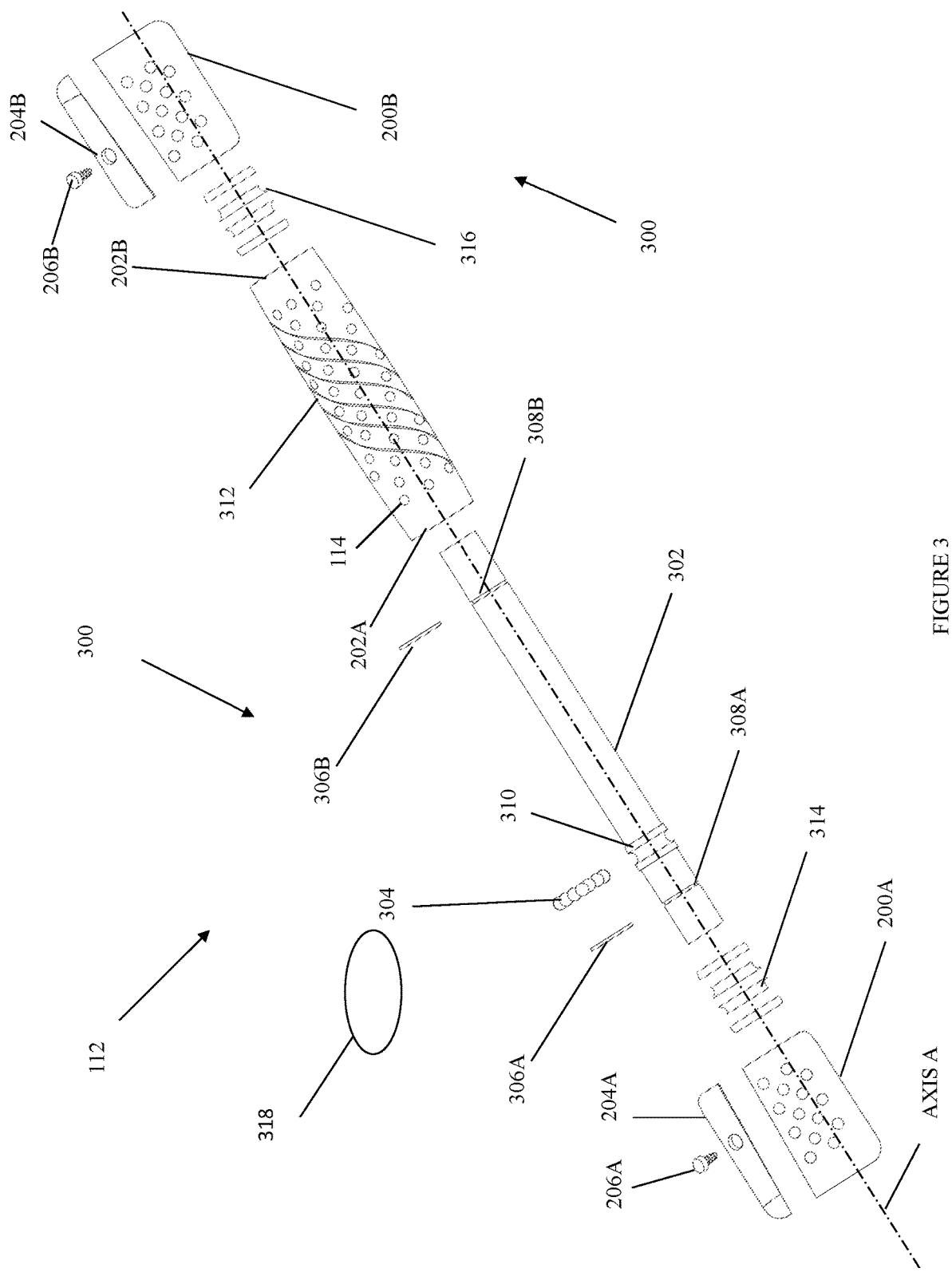
FIG. 3 is an exploded detailed side view of the exemplary first roller assembly of FIG. 2 and elements of the cutter cartridge of FIG. 2.

Referring now generally to the Figures particularly to FIG. 3, FIG. 3 is an exploded detailed side view of the cutter cartridge 112 of the first roller assembly 102 and elements of an exemplary first retention assembly 300. The first retention assembly 300 of the first roller assembly 102 includes the pair of pillow blocks 200A & 200B, the first wedge 204A and the second wedge 204B, a bearing shaft 302, a plurality of ball bearings 304, and two static O-ring shaft seals 306A & 306B. The bearing shaft 302 is fixedly coupled to the pair of pillow blocks 200A & 200B by pins (not shown) and is shaped from a first shaft seal groove 308A, a second shaft seal groove 308B and a shaft race 310. The first shaft seal groove 308A is sized and shaped to seat the a first static O-ring shaft seal 306A while a first roller cutter 312 of the first roller assembly 102 is positioned about the bearing shaft 302 and the bearing shaft 302 is coupled to the pair of pillow blocks 202A & 202B. The shaft race 310 is also sized and shaped to seat the plurality of ball bearings 304 while the first roller cutter 312 is positioned about the bearing shaft 302 and the bearing shaft 302 is coupled to the pair of pillow blocks 202A & 202B.

It is understood that a key function of the faces seals 314 & 316 is to keep external debris 318 from polluting a volume between of the roller cutter 312 and the bearing shaft 302.

FIG. 3 further presents an exemplary first mechanical face seal 314, an exemplary second mechanical face seal 316 and the first roller cutter 312. The first roller cutter 312 is comprised with the first roller assembly 102 and includes the plurality of cutting inserts 114. The first mechanical face seal 314, and the second mechanical face seal 316 sized and shaped to fit operationally around the bearing shaft 302, within an internal channel 320 of the first roller cutter 312 (as shown in FIGS. 4A and 4B) and partly within each of the pillow blocks 200A & 200B.

Referring now generally to the Figures particularly to FIG. 4A and FIG. 4B, the first mechanical face seal 314 (hereinafter, "the first face seal" 314) is coupled in part to the first pillow block 200A and is additionally coupled in part to the first roller assembly 102 at the first end 202A, and the second mechanical face seal 316 (hereinafter, "the second face seal" 31) is coupled in part to the second pillow block 200B and is additionally coupled in part to the first roller assembly 102 at the second end 202B.

Figure 4A:
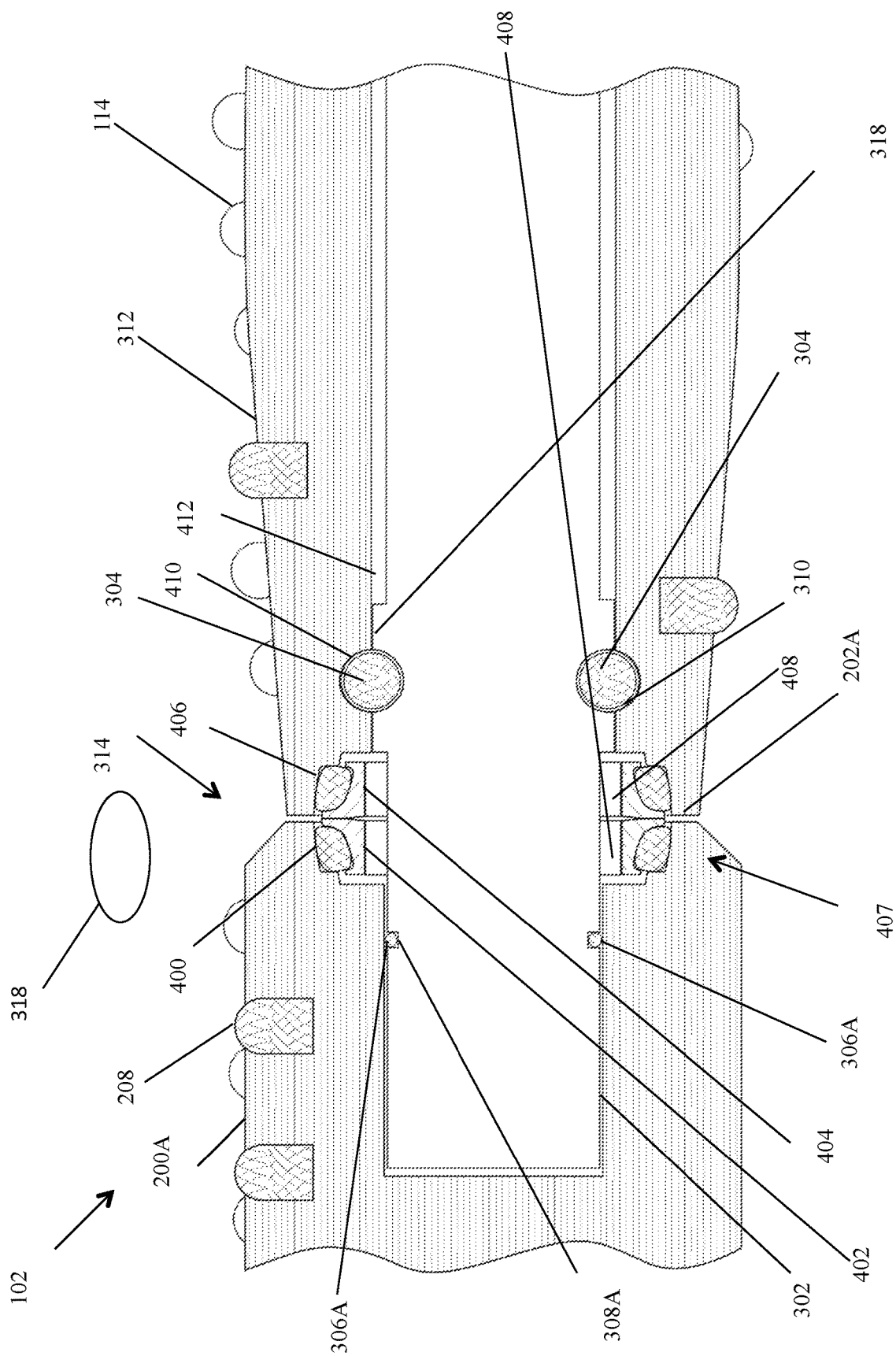
FIG. 4A is a cut-away detailed side view of a first invented mechanical face seal of FIG. 3 disposed between a first end of the first roller assembly of FIG. 2 and the first pillow block of FIG. 2.
Figure 4B:
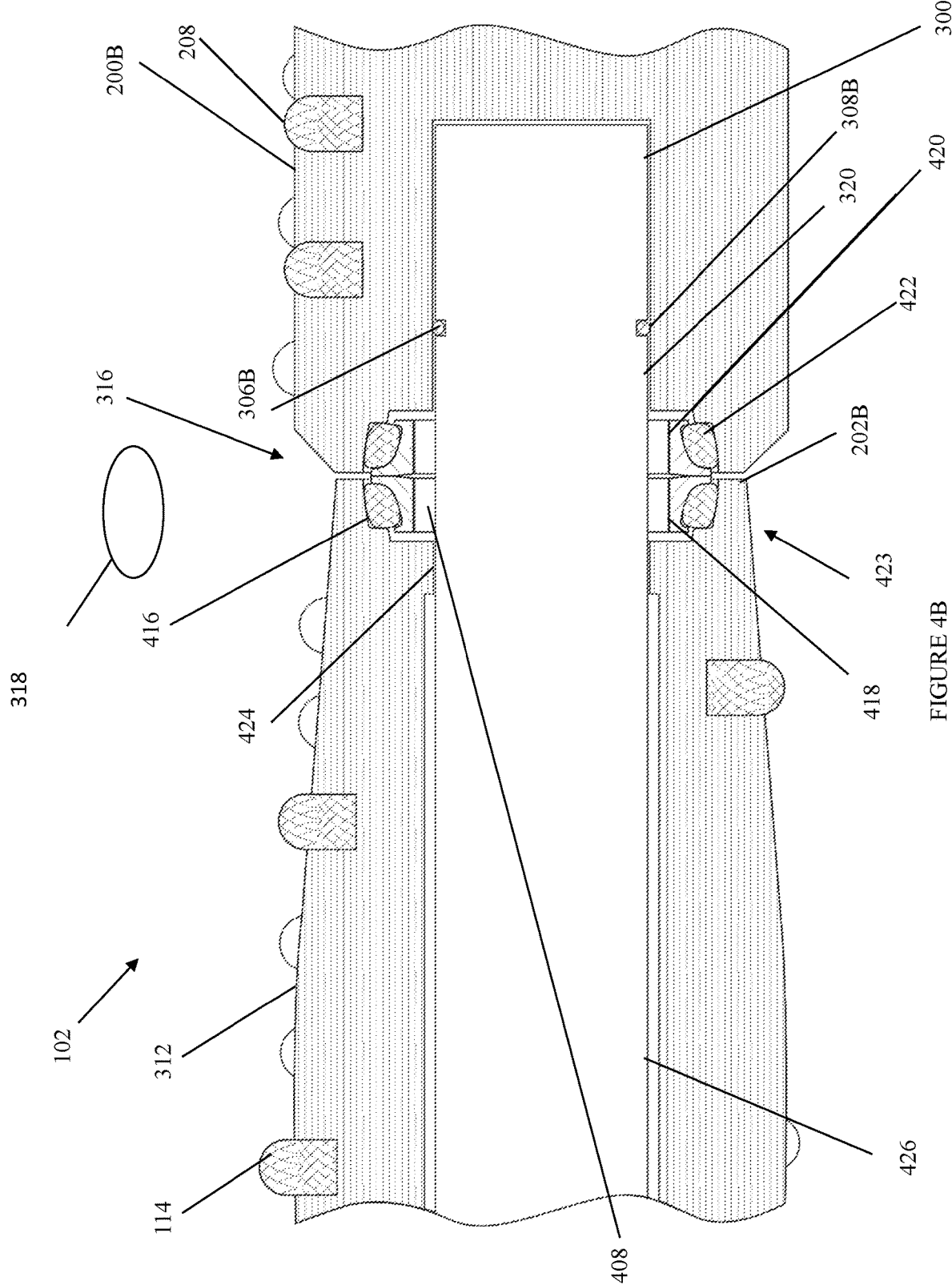
FIG. 4B is a cut-away detailed side view of a second invented mechanical face seal of FIG. 3 disposed between a second end of the first roller assembly of FIG. 2 and the second pillow block of FIG. 2.

Referring now generally to the Figures particularly to FIG. 4A, FIG. 4A is a cut-away detailed side view of the first face seal 314 as it is preferably disposed in part within both the first end 202A of the first roller assembly 102 and the first pillow block 200A. The first mechanical face seal 314 comprises a first outer energizer 400, a first outer seal ring 402, a first inner seal ring 404 and a first inner energizer 406. The first outer seal ring 402 is pressed against the first inner seal ring 404 by force received from the first outer energizer 400. It is understood that first pillow block 200A and the roller cutter 312 in combination present a first seal recess 407 which the first outer energizer 400 and the first inner energizer 406 of the first seal 314 rest.

It is understood that in operation of the invented reamer in a borehole that the first outer seal ring 402 and the first inner seal ring 404 are pressed together by the first outer energizer 400 and the first inner energizer 406.

The first inner seal ring 404 is sized and shaped to fit within first roller cutter 312; the first inner energizer 406 is captured between the first roller cutter 312 and the first inner seal ring 404. The first inner seal ring 404 is pressed against the first outer seal ring 402 by force received from the first inner energizer 406.

The first outer seal ring 402 is sized and shaped to encircle the bearing shaft 302 in a plane normal to the tool axis A while displaced from contact with the bearing shaft 302; the first inner seal ring 404 is sized and shaped to encircle the bearing shaft 302 in a plane normal to the tool axis A while optimally displaced from contact with the bearing shaft 302 by the volume of lubricant 408.

More generally, the first roller assembly 102 is optimally designed to maintain the outer and inner circumferences of several elements within planes normal the tool axis A while the first roller assembly 102 is assembled and positioned for operation within the first recess 108A, to include the static O-ring shaft seals 306A & 306B, the plurality of ball bearings 304, the first face seal 314 and the second face seal 316. It is noted that an upper race feature 410 of the roller cutter 312 is shaped, sized and positioned within the first roller cutter 312 to act in combination with the ball bearing race 310 of the bearing shaft 302 to maintain the plurality of ball bearings 304 in an operational orientation within a plane that is normal the elongate axis A; the plurality of ball bearings 304 help maintain a rotatable coupling of the bearing shaft 302 and the first roller cutter 312 while the plurality of ball bearings 304 are simultaneously seated in both the ball bearing race 310 of the bearing shaft 302 and the upper race feature 410 of the roller cutter 312 and thereby positioned within a plane that is normal the elongate axis A. The ball bearing races 310 & 410 and the ball bearings 304 lock the bearing shaft 302 within the cutter cartridge 112 and allow rotation of the roller cutter 312 about the bearing shaft 302, but prevent axial movement of the roller cutter 312 along the bearing shaft 302.

It is understood that a shaft step 412 of the bearing shaft 302 uniformly encircles the tool axis A and is disposed between the first mechanical seal 314 and a first shaft bushing 414. The bearing shaft step 412 forms the ball bearing race 310 and is shaped, sized and positioned to inhibit the first shaft bushing 414 from moving in the direction of the first pillow block 200A along the tool axis A.

Referring now generally to the Figures particularly to FIG. 4B, FIG. 4B is a cut-away detailed side view of the second face seal 316 disposed between the first cutter roller 312 and the second pillow block 200B. The second face seal 316 is sized and shaped to simultaneously fit within both the second pillow block 200B and within the first roller cutter 312 at the second end 202B of the first roller assembly 102.

The second face seal 316 comprises a second inner energizer 416, a second inner seal ring 418, a second outer seal ring 420 and a second outer energizer 422. It is understood that second pillow block 200B and the cutter cartridge 112 in combination present a second seal recess 423 which the second outer energizer 422 and the second inner energizer 416 of the first seal 316 rest.

It is understood that in operation of the invented reamer in a borehole that the second outer seal ring 420 and the second inner seal ring 418 are pressed together by the second outer energizer 422 and the second inner energizer 416.

The second inner seal ring 418 is sized and shaped to fit within the first roller cutter 312; the second inner energizer 416 is captured between the first roller cutter 312 and the second inner seal ring 418. The second inner seal ring 418 is pressed against the second outer seal ring 420 by force received from the second inner energizer 416.

The first outer seal ring 402, first inner seal ring 404, second inner seal ring 418 and/or the second outer seal ring 420 may be or comprise Carbon, Ceramic, Ni-resist, 17-4, Silicon Carbide, Tungsten Carbide, a Cast Iron Alloy, graphite filled Polytetrafluoroethylene, and/or suitable materials coatings, coated surfaces known in the art, to include plasma coatings that comprise silicon or tungsten carbide sprayed onto a stainless steel seal head. The first outer energizer 400, the first inner energizer 406, the second inner 416 & second outer energizer 422 may be or comprise an elastomer and/or other suitable material known in the art.

The second outer seal ring 420 is sized, shaped and positioned within the first roller assembly 102 to encircle the bearing shaft 302 in a plane normal to the tool axis A while optimally displaced from contact with the bearing shaft 302 by a volume of lubricant 408; the second inner seal ring 418 is sized, shaped and positioned within the first roller assembly 102 to encircle the bearing shaft 302 in a plane normal to the tool axis A while optimally displaced from contact with the bearing shaft 302 by the volume of lubricant 408. Both the second inner energizer 416 and the second outer energizer 422 are sized, shaped and positioned within the first roller assembly 102 to encircle the bearing shaft 302 in a plane normal to the tool axis A.

It is again noted that the second shaft seal groove 308B of the bearing shaft 302 is optimally shaped, sized and positioned to maintain both outer and inner circumferences of the second static O-ring shaft seal 306B to encircle the bearing shaft 302 while the second static O-ring shaft seal 306B is positioned within a plane normal to the tool axis A.

It is understood that a roller cutter step 424 of the roller cutter 312 uniformly encircles the tool axis A and is disposed between the second mechanical seal 316 and a second shaft bushing 426. The roller cutter step 424 is shaped, sized and positioned to inhibit the second shaft bushing 426 from moving in the direction of the second pillow block 200B along the tool axis A. The second shaft bushing 426 is free to rotate about the bearing shaft 302 while captured between the bearing shaft 302 and the first roller cutter 312 in accordance with forces directed by and/or transferred through the lubricant 408, the bearing shaft 302 and the first roller cutter 312.

Figure 5:
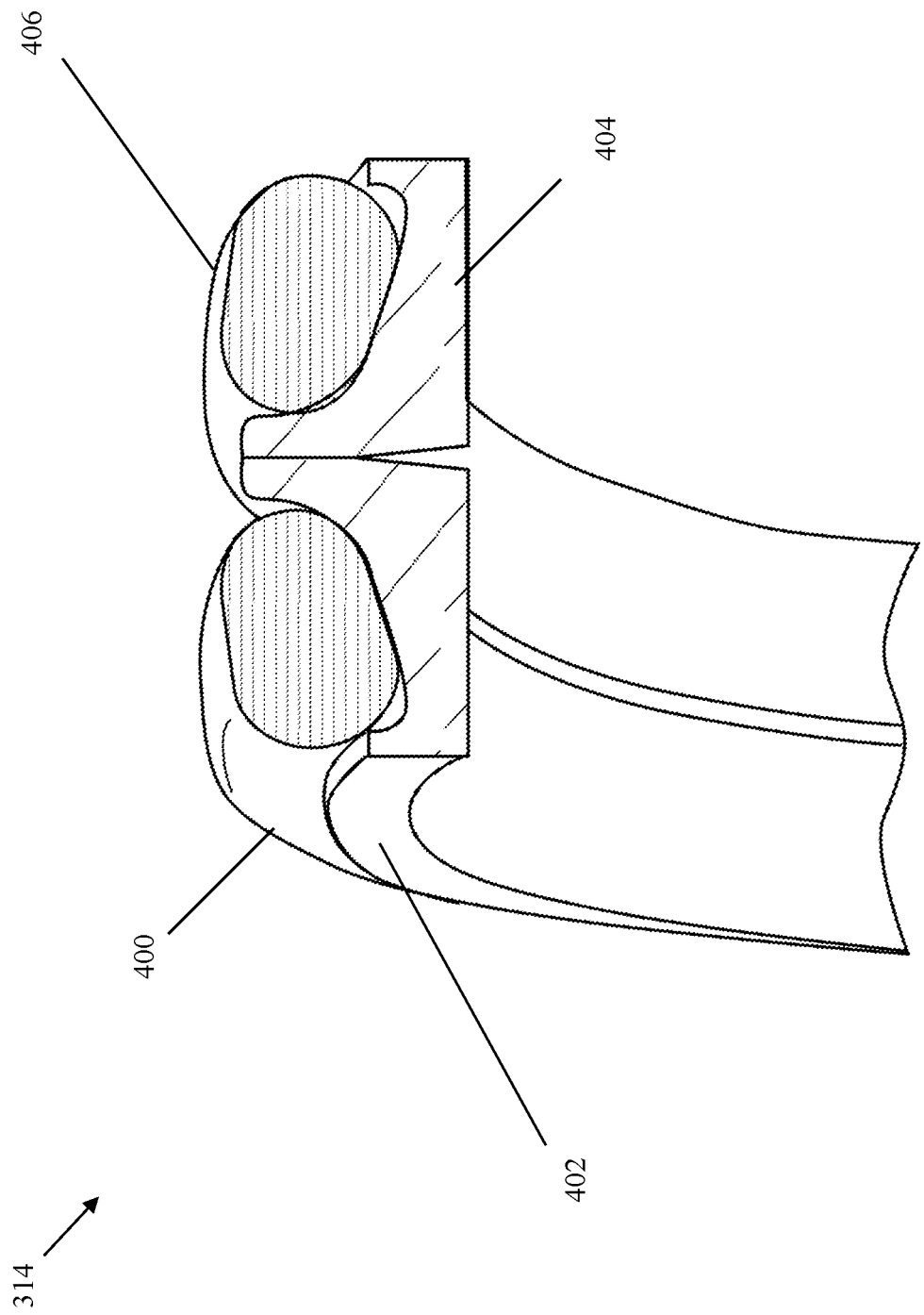
FIG. 5 is a partial cut-away perspective view of the exemplary first mechanical face seal of FIG. 3.

Referring now generally to the Figures particularly to FIG. 5, FIG. 5 is a partial cut-away perspective view of the exemplary first mechanical face seal 314. As disclosed in FIG. 4A and FIG. 4B, the first outer energizer 400 and the first outer seal ring 402 of the first mechanical face seal 314 are coupled with the first pillow block 200A, and the first inner energizer 406 and the first inner seal ring 404 of the first mechanical face seal 314 is coupled with the first roller cutter 312 at the first end 202A of the first roller assembly 102.

Figure 6:
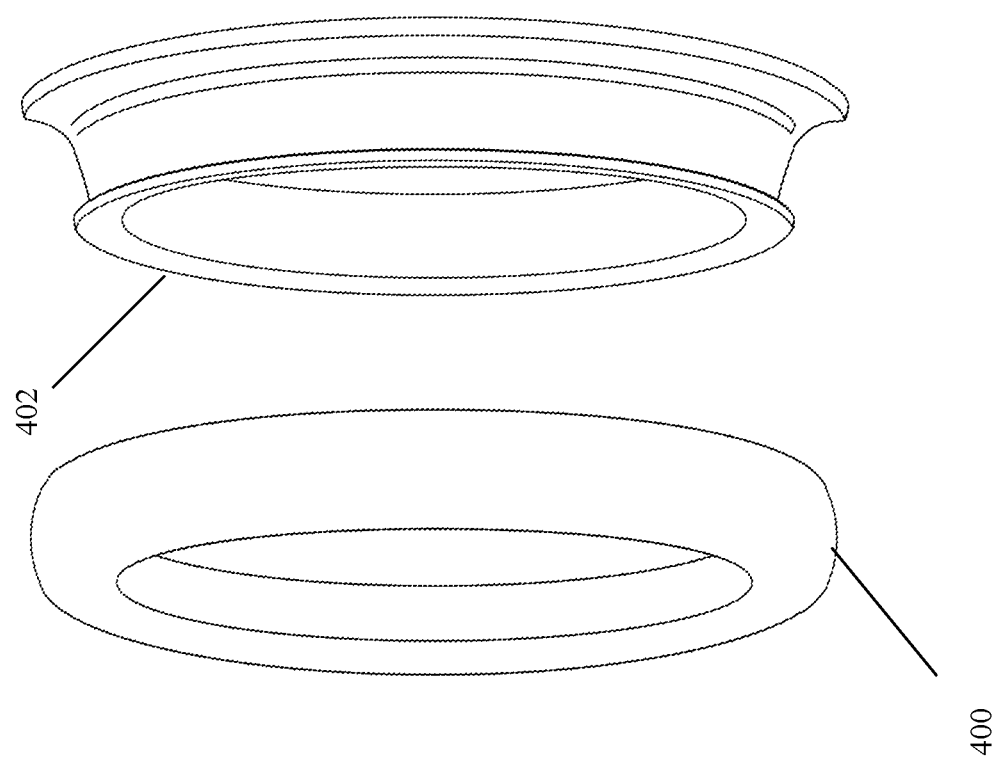
FIG. 6 is an exploded perspective view of the exemplary first mechanical face seal of FIG. 3.

Referring now generally to the Figures particularly to FIG. 6, FIG. 6 is an exploded perspective view of the first outer energizer 400 and the first outer seal ring 402 of the first face seal 314. It is understood that the outer energizer 400 and the outer seal ring 402 are each circular within a plane normal to the tool axis A when the first face seal 314 is installed in the configuration of FIG. 2.

Figure 7:
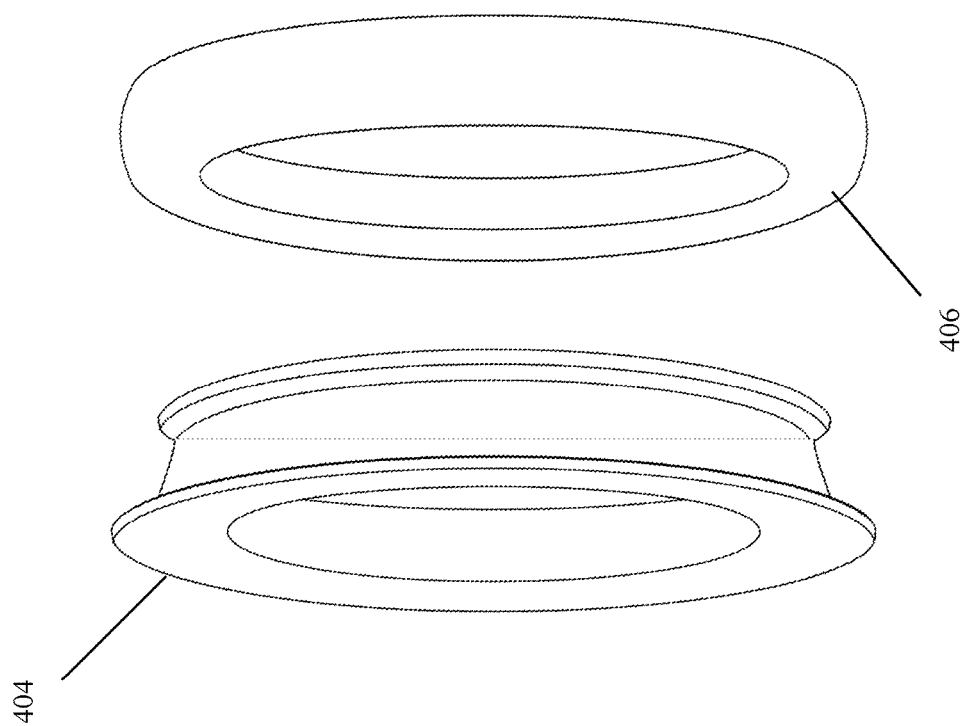
FIG. 7 is an exploded perspective view of the exemplary second mechanical face seal of FIG. 3.

Referring now generally to the Figures particularly to FIG. 7, FIG. 7 is an exploded perspective view of the first inner energizer 406 and the first inner seal ring 404 of the first face seal 314. It is understood that the first inner energizer 406 and the first inner seal ring 404 are each circular within a plane normal to the tool axis A when the first face seal 314 is installed in the configuration of FIG. 2.

Figure 8:
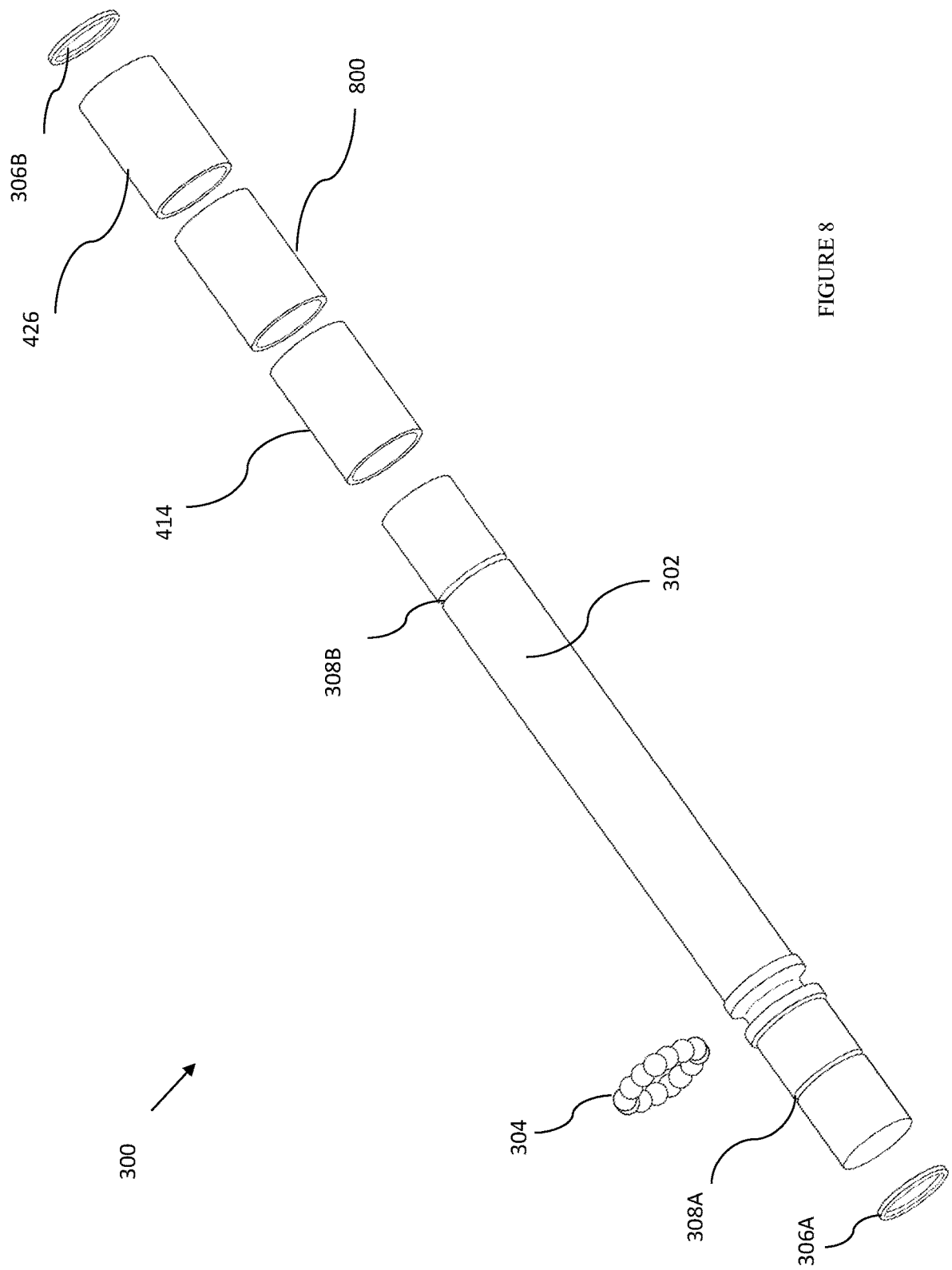
FIG. 8 is an exploded detailed side view of the exemplary first roller assembly of FIG. 2 and showing three additional shaft bushings.

Referring now generally to the Figures particularly to FIG. 8, FIG. 8 is an exploded detailed side view of the first roller assembly 102 and showing a third shaft bushing 800 positioned between the first shaft bushing 414 and the second shaft bushing 426. The third shaft bushing 800 is sized, shaped and positioned within the operationally assembled first roller assembly 102 to encircle the shaft 302. The first shaft bushing 414 and the second shaft bushing 426 respectively limit the axial degree of movement of the third shaft bushing 800 (a.) toward the first pillow block 200A, and (b.) toward the second pillow block 200B.

Referring now generally to the Figures particularly to FIGS. 1A, 1B, 3, 4A, 4B and 8, it is understood that the cutter cartridge 112 may include or comprise the roller cutter 312, the bearing shaft 302, the three shaft bushings 414, 426 & 800, the two wedge bolts 206A & 206B, the pair of pillow blocks 200A & 200B, the pair of shaft seal O-rings 306A & 306B, the plurality of ball bearings 304, two or more pins (not shown) that respectively attach the bearing shaft 302 to the separate pillow blocks 200A & 200B, and/or the two face seals 314 & 316.

Referring now generally to the Figures particularly to FIGS. 2, 3 and 8, it is disclosed in the present Application for patent that the first retention system 300 comprises the bearing shaft 302, the three shaft bushings 414, 426 & 800, the pair of wedges 204A & 204B, the two wedge bolts 206A & 206B, the pair of pillow blocks 200A & 200B, the pair of shaft seal O-rings 306A & 306B, the plurality of ball bearings 304, and two or more pins (not shown) that respectively attach the bearing shaft 302 to the separate pillow blocks 200A & 200B. It is understood that the retention system 300 may optionally comprise or merely be coupled with the first outer energizer 400, the first outer seal ring 402, the second outer energizer 422 and/or the second outer seal ring 420. It is understood that the three shaft bushings 414, 426 & 800 could be reformulated as one continuous or two complementary shaft bushings.

Figure 9:
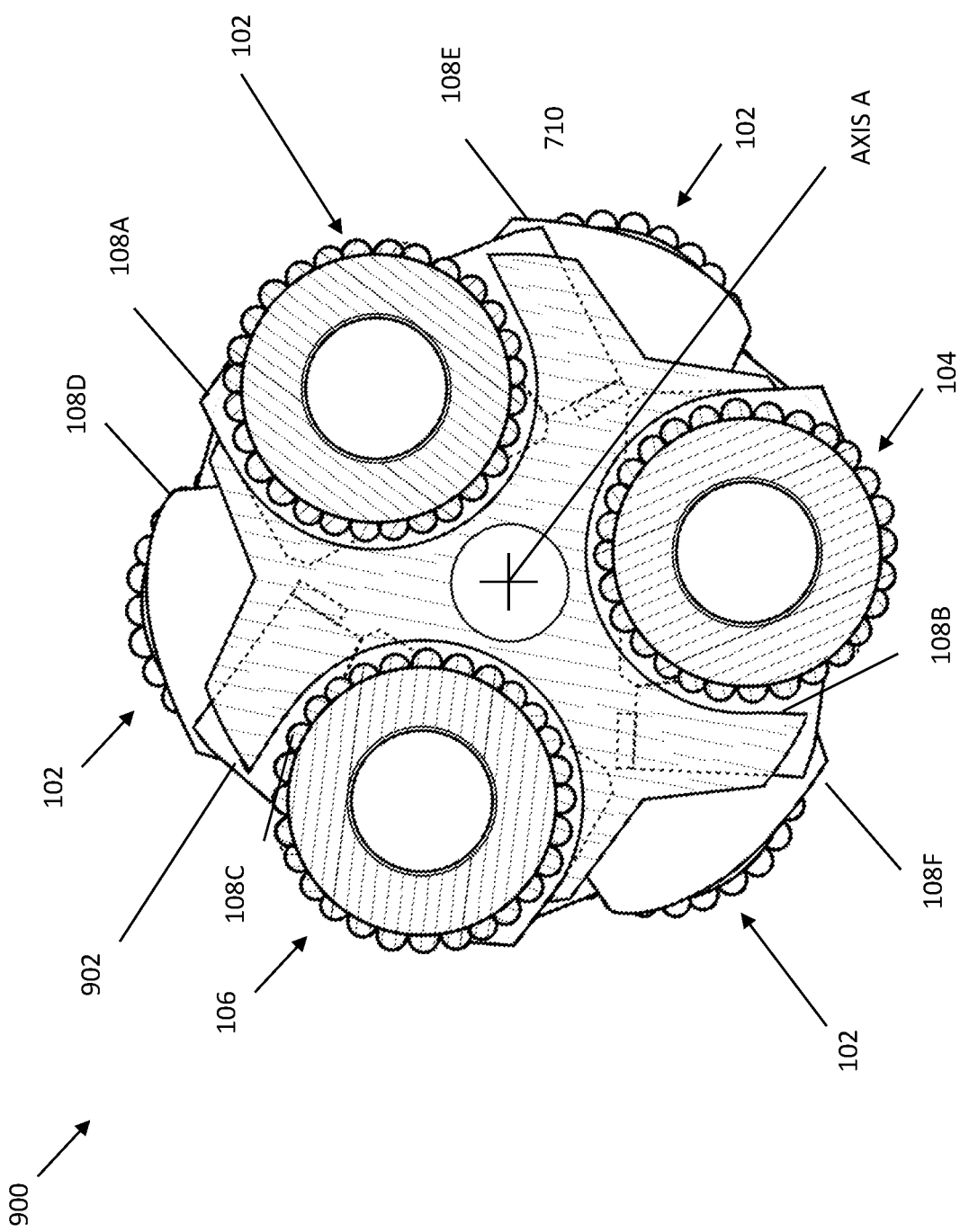
FIG. 9 is a top view cut-away view of a second invented roller reamer having three additional invented roller assemblies of FIG. 1A detachably coupled with an alternate tool body, wherein alternate tool body provides a total of six axial recess and the second invented roller reamer includes six roller assemblies of FIG. 1A.

Referring now generally to the Figures particularly to FIG. 9, FIG. 9 is a top cut-away view of a second invented roller reamer 900 having three additional invented roller assemblies 102 that are each separately, detachably and respectively coupled within separate and individual axial recesses 108D, 108E & 108F of an alternate tool body 902. It is understood the second invented roller assembly 104, the third invented roller assembly 106 and each of the additional roller assemblies 102 may present, include and/or be adapted to cooperate, engage and/or be coupled directly or indirectly with any and/or all aspects, components and/or elements 110-800 of the first roller assembly 102 or the cutter cartridge 112 as disclosed herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While selected embodiments have been chosen to illustrate the invented system, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

I claim:

1. A roller reamer comprising:
a tool body having at least one axial recess;
a roller assembly comprising a roller cutter and a retention assembly removably positioned with the at least one axial recess, wherein the roller cutter is rotatably coupled with the retention assembly; and
a first mechanical face seal disposed between the retention assembly and roller cutter, wherein an inner seal ring of the first mechanical face seal is coupled with the roller cutter at a first end of the roller cutter and a first inner energizer is disposed between the inner seal ring and roller cutter and the first inner energizer directs compressive force against the inner seal ring, and an outer seal ring of the mechanical face seal is coupled with the retention assembly and a first outer energizer is disposed between the outer seal ring and the retention assembly and the first outer energizer directs compressive force against the outer seal ring.

2. The roller reamer of claim 1, wherein the retention assembly comprises a pillow block and a bearing shaft, wherein the pillow block is removably coupled with the tool body and the bearing shaft, and the bearing shaft extends through the roller cutter.

3. The roller reamer of claim 2, wherein the retention assembly further comprises a wedge, the wedge adapted to detachably and fixedly couple the pillow block with the tool body.

4. The roller reamer of claim 2, wherein the bearing shaft extends fully through the roller cutter in parallel with a central axis of the tool body.

5. The roller reamer of claim 2, further comprising a second mechanical face seal positioned proximal to an opposing end of the roller cutter from the first end of the roller cutter.

6. The roller reamer of claim 5, wherein the second mechanical face seal is disposed between a second retention assembly and the roller cutter, wherein a second inner seal ring of the second mechanical face seal is coupled with the roller cutter at the second end of the roller cutter and a second inner energizer is disposed between the second inner seal ring and roller cutter and directs compressive force against the second inner seal ring, and a second outer seal ring of the second mechanical face seal is coupled with the second retention assembly and a second outer energizer is disposed between the second outer seal ring and the second retention assembly and directs compressive force against the second outer seal ring.

7. The roller reamer of claim 6, wherein the retention assembly further comprises a second pillow block and the second pillow block is removably coupled with the tool body and fixedly coupled with the bearing shaft and the second outer seal ring.

8. The roller reamer of claim 7, wherein the second retention assembly further comprises a second wedge, the second wedge adapted to detachably and fixedly couple the second pillow block with the tool body.

9. The roller reamer of claim 7, wherein the bearing shaft extends fully through the roller cutter in parallel with a central axis of the tool body.

10. The roller reamer of claim 2, wherein the pillow block comprises a plurality of cutting inserts.

11. The roller reamer of claim 2, wherein the retention assembly comprises a plurality of cutting inserts.

12. The roller reamer of claim 1, wherein the roller cutter comprises at least one cutting insert.

13. The roller reamer of claim 12, wherein the roller cutter comprises a plurality of cutting inserts.

14. The roller reamer of claim 12, wherein at least one cutting insert of the plurality of cutting inserts comprises tungsten carbide.

15. The roller reamer of claim 1, wherein the retention assembly comprises a plurality of cutting inserts.

16. The roller reamer of claim 1, wherein the tool body comprises a plurality of cutting inserts.

17. The roller reamer of claim 1, further comprising:
a plurality of axial recesses of the tool body;
a plurality of cutter cartridges, each cutter cartridge detachably coupled with a unique recess of the plurality of axial recesses, and each cutter cartridge comprising a retention assembly rotatably coupled with a roller cutter and at least one mechanical face seal disposed between the retention assembly and the roller cutter of the comprising cutter cartridge; and each mechanical face seal comprising an inner seal ring with the roller cutter at a first end of the roller cutter and a first inner energizer is disposed between the inner seal ring and roller cutter and the first inner energizer directs compressive force against the inner seal ring, and an outer seal ring of the mechanical face seal coupled with the retention assembly and a first outer energizer, wherein the first outer energizer is disposed between the outer seal ring and the retention assembly and directs compressive force against the outer seal ring.

18. The roller reamer of claim 17, wherein each retention assembly comprises a bearing shaft extending through the coupled roller cutter in parallel with a central axis of the tool body.

19. The roller reamer of claim 18, wherein each retention assembly comprises a pair of pillow blocks fixedly attached to the bearing shaft at opposing ends of the bearing shaft.

20. The roller reamer of claim 19, wherein each retention assembly comprises a pair of wedges adapted to in combination detachably couple the pair of pillow blocks of the comprising retention assembly with the tool body.

* * * * *